(No Model.)

P. HINKLEY.
LAWN MOWER.

No. 328,310. Patented Oct. 13, 1885.

Witnesses.
Jacob W. Poeper
W. P. Smith

Inventor.
Philander Hinkley
By H. P. Hood
Atty.

UNITED STATES PATENT OFFICE.

PHILANDER HINKLEY, OF CHARLESTON, ILLINOIS.

LAWN-MOWER.

SPECIFICATION forming part of Letters Patent No. 328,310, dated October 13, 1885.

Application filed May 3, 1884. Serial No. 130,223. (No model.)

*To all whom it may concern:*

Be it known that I, PHILANDER HINKLEY, a citizen of the United States, residing at Charleston, in the county of Coles, State of Illinois, have invented a new and useful Improved Lawn-Mowing Machine, of which the following is a specification.

My invention relates to an improved arrangement of the driving-wheel in lawn-mowers and in an improved means for transmitting motion from the driving-wheel to the cutting-knives.

The object of my improvement is to enable the mower to move and cut in a curved path, as hereinafter explained.

The accompanying drawings illustrate my invention.

Figure 1:
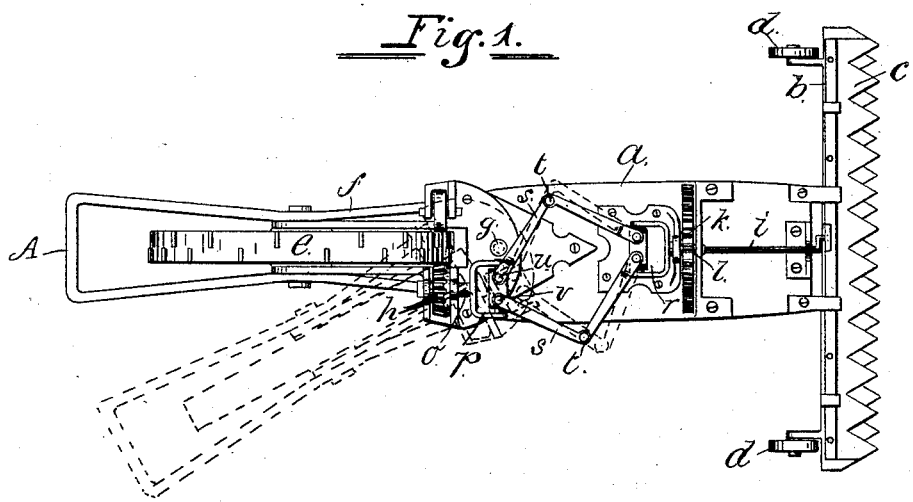
Figure 2:
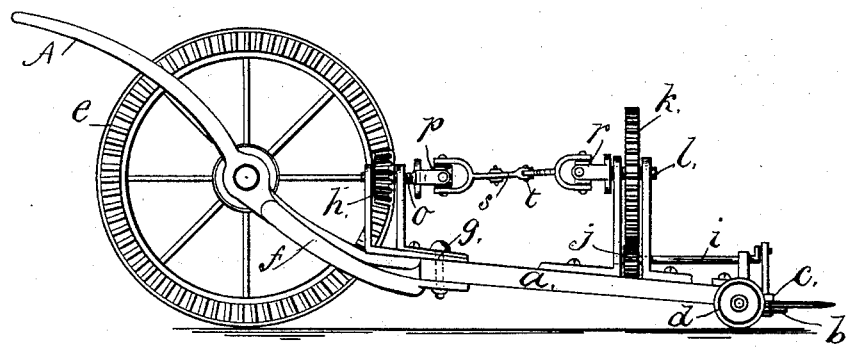

Figure 1 is a plan; Fig. 2, a side elevation.

$a$ is the main frame.

$b$ is the sickle-bar, secured to the forward end of frame $a$ and carrying in suitable bearings the reciprocating sickle $c$.

$d$ $d$ are small trucks supporting the ends of the sickle-bar and forward end of the main frame.

$e$ is the carrying and driving wheel, mounted on its axis in a frame, $f$. The forward end of frame $f$ forms a clevis, which embraces and supports the rear end of frame $a$, and is pivoted thereto, so as to swing in a horizontal plane, by a coupling-bolt, $g$. One side of driving-wheel $e$ is provided with cog-teeth, which intermesh with the teeth of a pinion, $h$, which is secured to a shaft, $o$, mounted in bearings on frame $f$.

The sickle is reciprocated by means of a crank-shaft, $i$, mounted in bearings on frame $a$, and carrying at one end a pinion, $j$, meshing with a gear-wheel, $k$, which is secured to a short shaft, $l$, mounted in bearings on frame $a$. The ends of shafts $l$ and $o$ are connected by means of gimbal-joints $p$ $r$ and a pair of coupling-rods, $s$ $s$.

It will be observed that as frame $f$ swings from one side to the other on the coupling-bolt $g$, as indicated in dotted lines in Fig. 1, the distance between the ends of shafts $l$ and $o$, and also the angle formed by the two shafts, is constantly changing. For this reason neither the ordinary single rigid coupling-rod commonly used in a universal coupling or the well-known telescoping coupling-shaft used for the same purpose would make a suitable connection between the gimbal-joints $p$ and $r$ in this case. I therefore provide two coupling-rods, $s$ $s$, each somewhat longer than the greatest distance between the ends of shafts $l$ and $o$, and each furnished with a hinge-joint, $t$, about midway of their length. Said rods $s$ are forked at each end, and are pivoted to the gimbal-joints $p$ and $r$ preferably by separate pivots $u$ and $v$; but they may be both pivoted to one pivot, one fork in that case being made wide enough to embrace the other.

When rods $s$ are coupled to their gimbal-joints, they are bent outward at their joints $t$, as shown in Fig. 1. A flexible coupling is thus formed, which permits the swinging movement required between frames $f$ and $a$.

A is a handle for propelling the machine.

In operation the sickle is reciprocated by crank-shaft $i$, which is driven by the wheel $e$ through the train of gearing connecting said shaft and wheel. Driving-wheel $e$ also acts as a castor or guiding wheel, which, being turned at an angle to frame $a$, causes the machine to move in a curved path.

I claim as my invention—

1. Two frames pivoted together, two shafts arranged to revolve on separate bearings on said frames, two gimbal-joints, one secured to each of said shafts, and a pair of jointed coupling-rods forked at each end and pivoted to said gimbal-joints, all combined substantially as and for the purpose specified.

2. In a lawn-mowing machine, frames $a$ and $f$, sickle-bar $b$, wheel $e$, pinion $h$, shaft $o$, gimbal-joints $p$ and $r$, coupling-rods $s$ $s$, gear-wheel $k$, shaft $l$, pinion $j$, crank-shaft $i$, and sickle $c$, all combined substantially as specified.

PHILANDER HINKLEY.

Witnesses:
GEORGE W. BALSEN,
CHAS. W. HARR.